Feb. 10, 1931.       D. M. BENTON       1,791,997
VEHICLE CHECK FOR RAILWAY CROSSINGS
Filed Nov. 19, 1929     5 Sheets-Sheet 1

Daniel M. Benton, INVENTOR

BY Victor J. Evans ATTORNEY

Daniel M. Benton INVENTOR

BY Victor J. Evans ATTORNEY

Feb. 10, 1931.                 D. M. BENTON                 1,791,997
                    VEHICLE CHECK FOR RAILWAY CROSSINGS
                    Filed Nov. 19, 1929       5 Sheets-Sheet 3

Daniel M. Benton
INVENTOR

BY Victor J. Evans
ATTORNEY

Feb. 10, 1931.  D. M. BENTON  1,791,997
VEHICLE CHECK FOR RAILWAY CROSSINGS
Filed Nov. 19, 1929  5 Sheets-Sheet 4

Daniel M. Benton
INVENTOR

BY Victor J. Evans
ATTORNEY

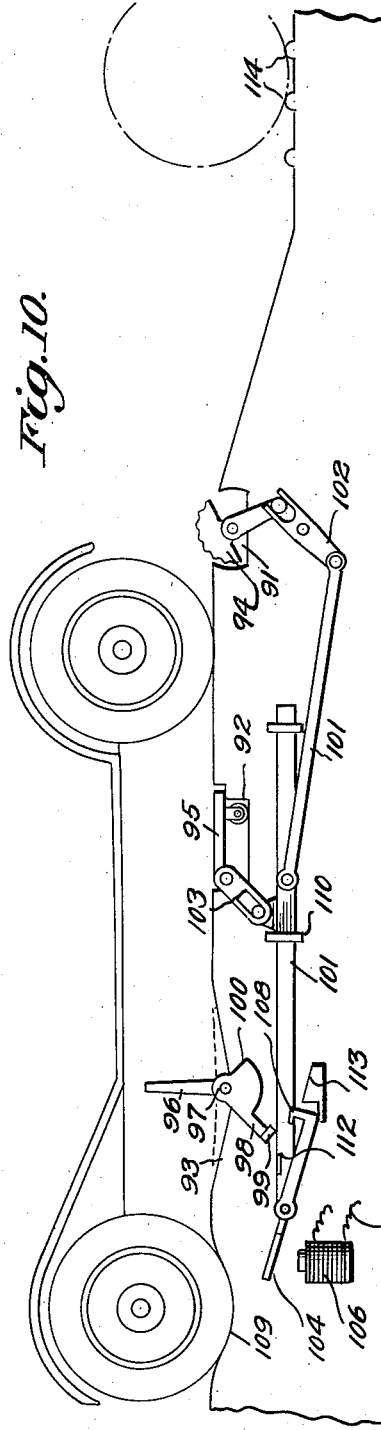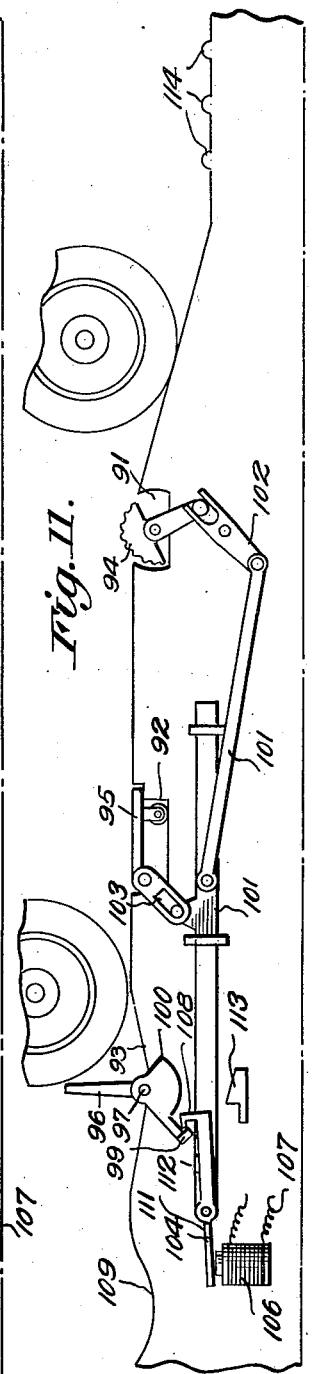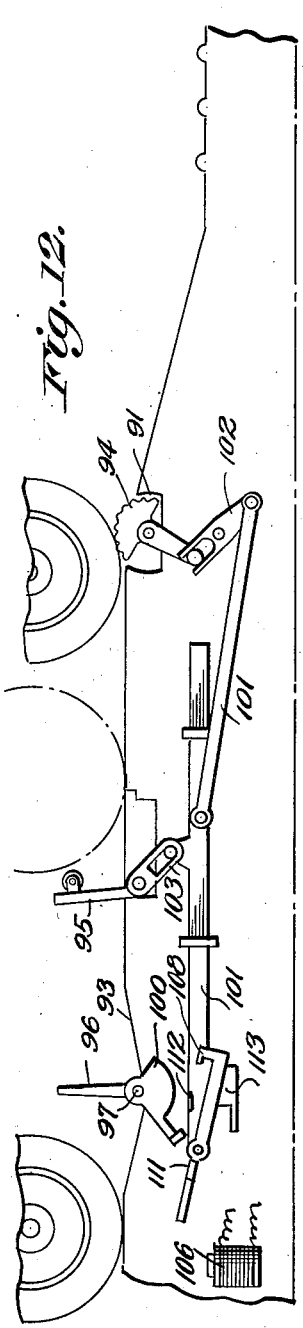

Patented Feb. 10, 1931

1,791,997

UNITED STATES PATENT OFFICE

DANIEL M. BENTON, OF MACON, GEORGIA

VEHICLE CHECK FOR RAILWAY CROSSINGS

Application filed November 19, 1929. Serial No. 408,330.

My present invention has reference to a vehicle check or stop that is arranged at a railway or other crossing, my primary object being to prevent casualties which frequently result from automobiles and trains or other vehicles colliding at such crossings.

Another and important object is the provision of means whereby the automobile will be caused to pass an obstruction and be retarded in its movement before entering the crossing so that the driver thereof will have evidence that he is in close proximity to such crossing.

A still further object is the provision of both electrically and automatically manually operated means for preventing the collision of vehicles at a crossing.

To the attainment of the foregoing and many other objects which will present themselves, the improvement further consists in certain other novel features of construction, combination and operative association of parts, satisfactory embodiments of which are disclosed by the accompanying drawings.

In the drawings:

Figure 10 is a side elevation illustrating a further modification.

Figure 11 is a similar view but showing the arrangement of parts when the vehicle has traveled partly thereover.

Figure 12 is a similar view showing the manner in which the vehicle is obstructed.

Figure 1:
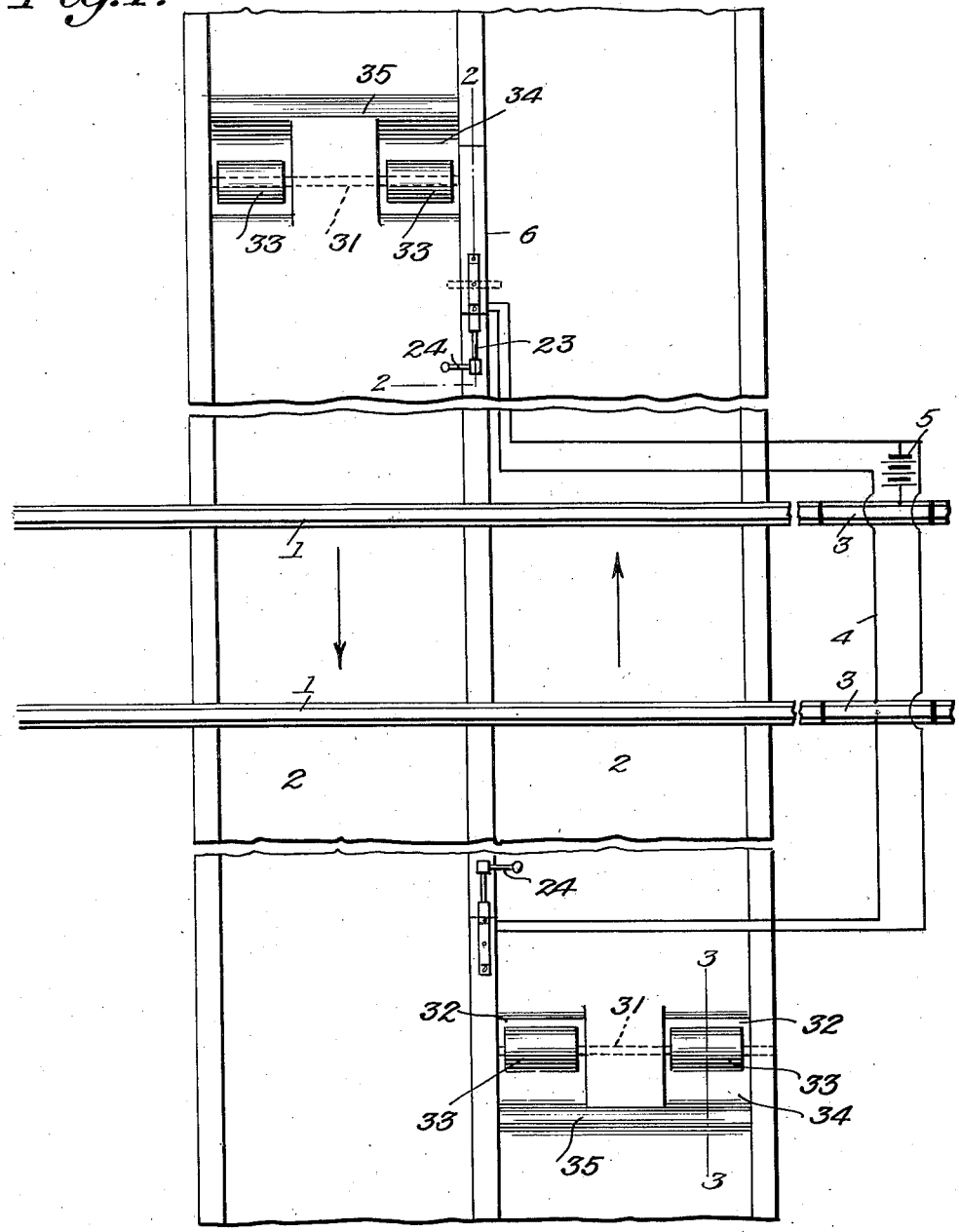
Figure 1 is a plan view of one form of the improvement.

While in the drawings I have illustrated and will hereinafter describe my improvement in connection with a railroad crossing, it is obvious that the same may be employed in connection with crossings for other types of vehicles, such for instance, as ordinary road crossings.

Figure 2:
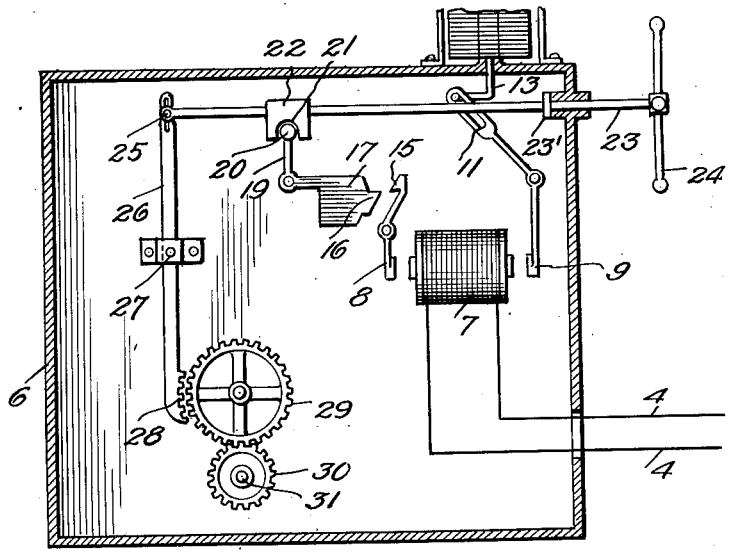
Figure 2 is an enlarged sectional view approximately on the line 2—2 of Figure 1.
Figure 3:
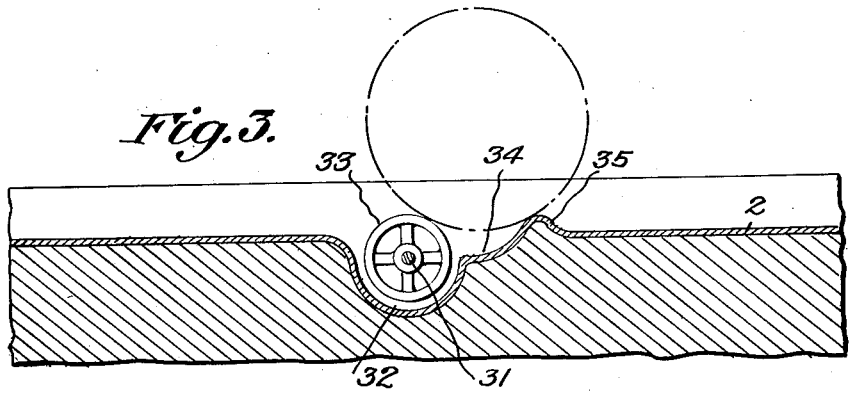
Figure 3 is a sectional view on the line 3—3 of Figure 1.

Referring now to the drawings in detail and to Figures 1 to 3 in particular, the numeral 1 designates the rails of a crossing and the numerals 2 designate the runways or roadways for an automobile or like vehicle which traverses the rails 1.

The track provided by the rails 1, at a suitable distance from the crossing has connected therewith but insulated therefrom other rails 3 that provide a block. The block rails are provided with the usual conductor wires 4 and one of the block rails is wired to a battery 5.

In Figure 1 of the drawings the roadways or highways 2 are centrally divided by a ridge and likewise have their ends formed with ridges so that vehicles traveling in opposite directions over said road or runways will be properly directed. In the central division or ridge for the runways, at a suitable distance from the sides of the track I partly embed box-like casings 6. In each of the casings there is an electro-magnet 7 and each magnet is connected with the respective block wires 4. These magnets are designed to attract armatures 8 and 9, respectively, each being pivotally secured in the casing 6. The armature 9 is in the nature of an angle arm and has an upper or outer slotted end 11 which receives therethrough a pin on the angle end of a rod or post 13. The post when turned operates an alarm, such as a bell, light, semaphore, etc., and the said signal is disposed above the casing. The signal, of course, is operated as soon as the train enters the block to warn drivers of vehicles that such train is approaching the crossing.

The armature 8 is also in the nature of an angle arm but has its upper or outer end formed with a hook 15 that is movable to engage with a protrusion 16 on the weighted end 17 of a bell crank lever which is pivoted in the casing 6. The second and upwardly directed arm 19 of the bell crank lever terminates in a rounded head 20, and this head is received in a curved notch 21 that is formed on the under face of a rectangular member or block 22. The block 22 is fixedly secured on a rod 23. The rods 23 are movable through bearing openings in the casing 6 and have on their outer ends arms or levers 24 that slightly extend over the respective runways 2.

The inner end of each of the rods 23 carries a pivot pin 25 that passes through an elongated slot in the upper end of an arm 26. If desired and as disclosed by the drawings, suitable stop means 23' may be arranged on the rod 23 to limit the outward movement of the said rod through the casing 6.

Each arm 26 is arranged substantially vertically in the casing 6 and is approximately centrally pivoted, as at 27, to a suitable bracket in the said casing. The lower end of each arm 26 is formed with a rack surface 28 that is movable to engage with the teeth of a wheel 29, the said wheel having its shaft suitably journaled in the casing 6. The toothed wheel 29 is in mesh with a pinion 30, and the shaft for the respective pinions 30 is indicated by the numeral 31 and has one end journaled in and its other end projecting through one side of the casing 6.

The projecting ends of the shaft 31 extend over the respective road or runways 2 and are received in concaved depressions 32 in the said runways. The concaved depressions provide pockets for the lower peripheries of rollers 33. From the pockets the surfaces of the runways have depressed portions 34 which are directed outwardly from the said pockets, and the said runways at the terminal of the depressed portions 34 are formed with upstanding transversely arranged ridges 35.

The operation of this construction may be briefly described as follows: The weighted end of the bell crank lever will swing the same to the position disclosed by Figure 2 of the drawings, causing the rod 23 to be moved until its stop element 23' contacts with the bearing for the said rod. This movement of the rod will swing the arm 26 to bring its rack surface out of engagement with the teeth of the wheel 29. A vehicle approaching the crossing will have its driving wheels contact with the obstructing elements 35 which gives the occupants thereof notice that the railway is in close proximity to their machine. When the signal 14 is not in signaling position the operator is aware that a train has not entered the block and he will then place one hand on the handle or lever 24, with his other hand remaining upon the steering wheel and move the rod 23 inward of the casing which causes the rack surface 28 on the arm 26 to mesh with the wheel 29 and this engagement will cause the toothed wheel 29 to lock pinion 30 and the shaft thereon and consequently the roller 33 which is mounted on the shaft to be held from turning. As only the upper periphery of the roller 33 projects through the pocket 32 and as the wheel is held stationary the driving wheels of the vehicle may safely pass over the crossing. A release of pressure upon the handle or lever 24 will cause the weighted end 17 of the bell crank lever to move the parts to their initial position, as disclosed by Figure 2 of the drawings, thereby bringing the rack 28 out of engagement with the toothed wheel 29. Should, however, a train enter the block the electro-magnet 7 will be energized and will attract both of the armatures 8 and 9. The swinging of the armature 9 turns the signal device 14 to signaling position which duly warns the operator of the vehicle of the fact that a train has entered the block. The swinging of the armature 8 will cause the hooked end 15 thereof to engage with the protrusion or nose 16 of the bell crank lever 17 which will hold the arm 26 in the position disclosed by Figure 2, so that the rack 28 is out of mesh with the toothed wheel 29 and the result is that this wheel as well as the pinion 30, the shaft 31 and the roller 33 thereon will freely turn. The turning of this wheel offers a resistance to the turning of the driving wheels of the vehicle, and while such wheels may be free to turn the vehicle can make no headway in the direction of the crossing and must remain stationary until the train has passed the crossing. It is to be noted that the latching engagement of the armature 8 with the bell crank lever will prevent the movement of the rod 23 when pressure is exerted upon the lever or handle 24 thereon and consequently the driver of the vehicle cannot impart a longitudinal movement to the rod until after the train passes the crossing and the electro-magnet 7 is deenergized. After the passage of the train the driver of the vehicle may operate the rod to swing the arm to lock the roller 33 from turning, so that the roller 33 will then offer little obstruction to the movement of the wheels of the vehicle in the direction of the crossing.

Figure 4:
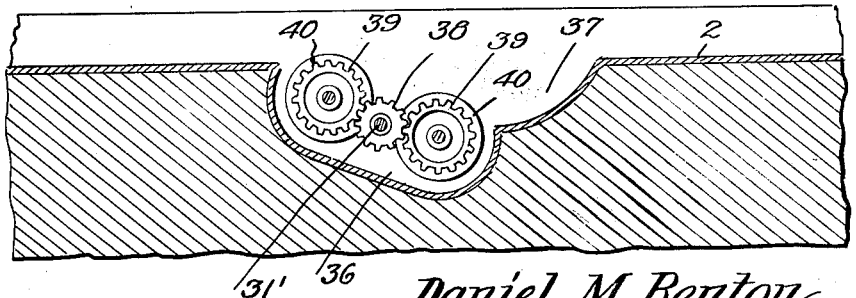
Figure 4 is a similar section but illustrating another form of the improvement.

In Figure 4 the runways 2 are provided with comparatively deep angularly arranged pockets 36 and with outer depressed portions 37 that communicate with the pockets. In the angular portions of the pockets there is centrally received the shaft 31'. The shaft in this instance has fixed thereon a pinion 38 which is in mesh with toothed wheels 39—39 on the ends of rollers 40—40. The shafts for the rollers are arranged angularly in the pockets 36 and consequently the periphery of one of the rollers is disposed only slightly below the surface of the runway and the periphery of the second roller is disposed adjacent the concaved obstructing surface 36 in the runway. The device is operated in a manner as previously described, the exception being that the driving wheels of the vehicle will fall into the depression 36, causing the driver of the automobile to note that he is approaching a crossing. If the signal 14 is not operated or flashed he can grasp the handle or lever 24 on the rod 23 and operate the said rod to swing the arm 26 to cause its rack surface to mesh with the wheel 29 and to lock the wheel 29 to the wheel 30, thereby preventing the turning of the shaft 31 and consequently the turning of the rollers 40, so that the driver can with little obstruction travel over the crossing. When a train enters the block the parts disclosed by Figure 2 will be operated in the same manner as previously described which, of course, permits of the free turning of the rollers 40 which offer retarding devices for the driving wheels of the vehicle, so that the vehicle cannot proceed toward the crossing until after the train passes the block and crossing and the electro-magnet 7 is deenergized.

Figure 5:
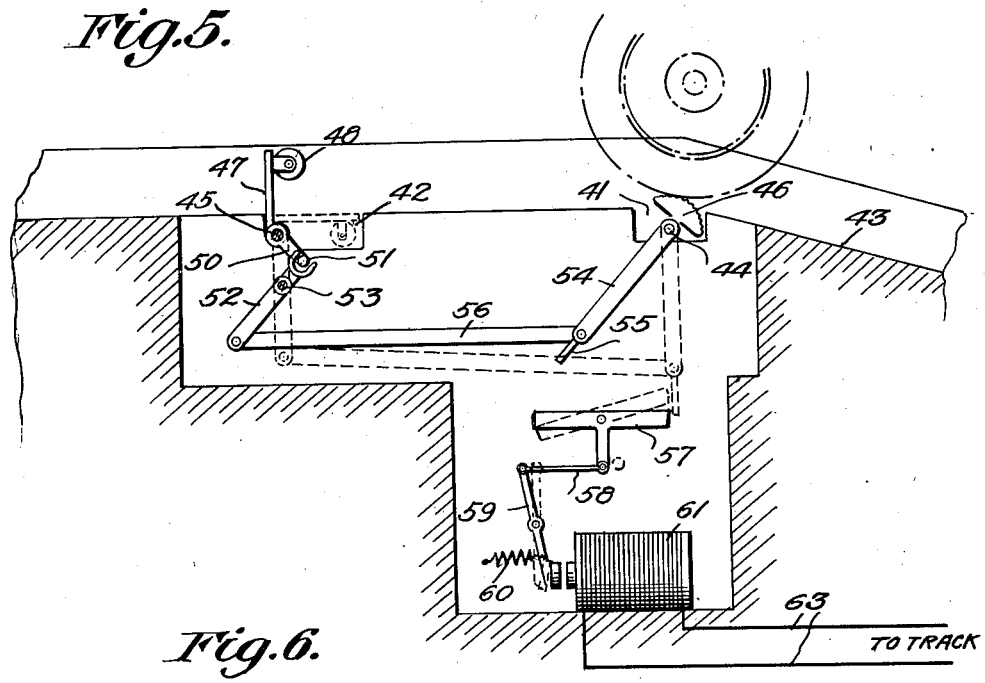
Figure 5 is a side elevation of another form of the improvement.
Figure 6:
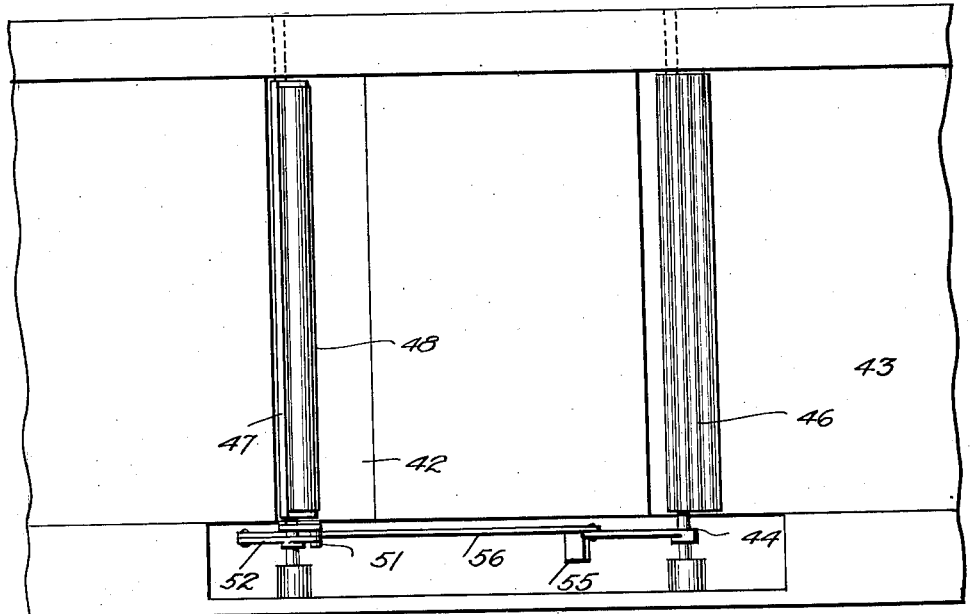
Figure 6 is a plan view thereof.

In Figures 5 and 6 the road or runways are provided with spaced transverse depressions to afford the same with pockets 41 and 42. The runways at their approach to the pockets 41 are inclined downwardly, as at 43, and the automobiles traveling these inclined planes and the driver of the automobiles traveling these inclined planes 43 will have warning that his machine is approaching a crossing.

The transverse depressions 41 and 42 are in the nature of pockets. Journaled in each of these pockets there are shafts 44 and 45, respectively. The shaft 44 in the pocket 41 has fixedly secured thereto a member that is provided with a cross sectionally arched head 46 and the said head is preferably serrated or roughened. The shaft 45 in the pocket 42 has fixed thereon ears carried by a plate 47 which is of a length and width to close the said pocket. The plate 47, on what I will term its inner face and adjacent to its free end is provided with ears that afford journals for the trunnions on the ends of a roller 48. From the shaft 45 there is fixed and there extends a lever 50 that has an outer angle end 51. This end is received in a bifurcation or notch in one end of an arm 52 which is pivoted, as at 53, to the side of a runway or drive. The shaft 44 has fixed thereto and extending therefrom an arm 54 which merges into a finger 55. Pivotally secured to the arms 52 and 54 there is a connecting bar or link 56 below which the finger 55 extends.

The numeral 57 designates a pivotally supported substantially T-shaped lever which is swingable to engage with the finger 55. To the central and depending arm of the trip lever 57 there is connected by a link 58 an armature 59 which is approximately centrally pivoted. The armature 59 is influenced by a spring 60 in a direction away from an electro-magnet 61, the said electro-magnet being connected by wires 63 to the block of the railroad.

It is, of course, to be understood that the arms 52 and 54 and a connecting link 56 may be arranged along both sides of the roadway. These parts are so weighted that the head 46 and the plate 47 are normally retained in a position as disclosed by the dotted lines in Figure 5 of the drawings.

After the vehicle has traveled over the inclined plane 43 the driver thereof will have knowledge that he is approaching the crossing. Should the signal not be flashed or turned the driver of the vehicle is aware that he can make the crossing with perfect safety. The head 46 being sustained in the pocket 41 and the plate 47 being arranged in the pocket 42 and having its upper face is a plane with the said pocket permits of the vehicle traveling over the device with little or no resistance. The elements 46 and 47 are held in their dotted line position by the engagement of the element 57 with the finger 55 when the electro-magnet 61 is not energized, but when the magnet is energized, this will attract the armature 59 and will swing the T-shaped trip member 57 to the full line position disclosed by Figure 5, bringing the said member 57 out of engagement with the finger 55. A vehicle traveling over the road or runway will have its driving wheel brought against the curved head 46 and will swing the same to the full line position disclosed by Figure 5. Such swinging of the head will, through the medium of the link 56, impart a swinging movement to the arm 52 and cause the plate 47 to assume the upright position disclosed in Figure 5 and the roller thereon will cause a further obstruction to the wheel 63 of the vehicle so that it is practically impossible for the vehicle to travel over the roadway as long as the electro-magnet is energized.

Figure 7:
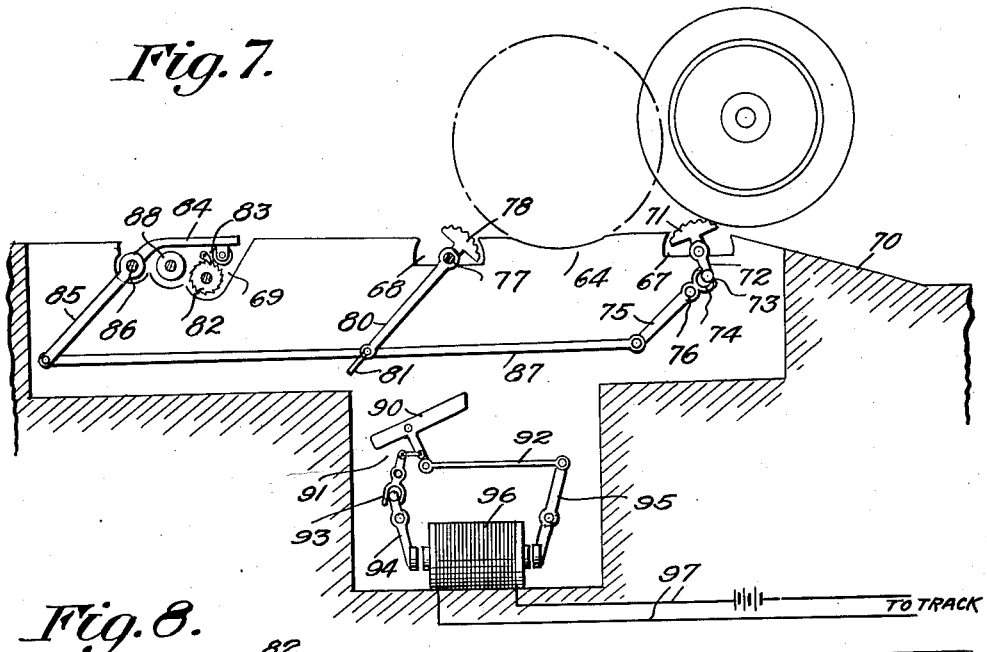
Figure 7 is a side elevation of still another form of the improvement.
Figure 8:
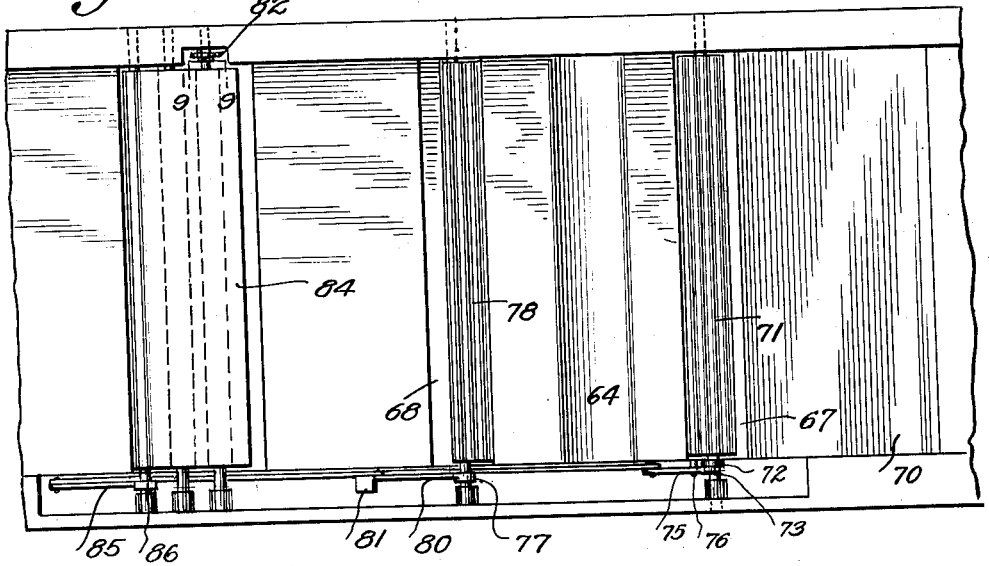
Figure 8 is a plan view thereof.
Figure 9:
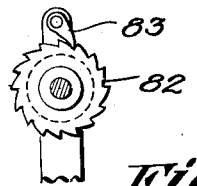
Figure 9 is a detail section on the line 9—9 of Figure 8.

In Figures 7, 8 and 9 the device is similar to that shown by Figures 5 and 6, except that the roadway for the automobile is provided with three spaced transversely arranged pockets 67, 68 and 69. The runway or roadway is formed with an inclined plane 70 that extends up to the pocket 67. The pocket 67 has pivotally secured therein a head 71 which is curved in cross section and which is roughened or knurled. The head 71 is similar to the head 46. A stem 72, through which the pivot for the head 71 passes and to which the said head is fixed, has an outer angle or ball end 73. This end 73 is received in the bifurcated end or socket 74 of a lever 75. The lever 75 is pivoted, as at 76.

Between the pockets 67 and 68 the roadway is formed with a rounded depression or concavity 64, while in the pocket 68 there is pivotally secured, as at 77, a semi-spherical or arcuate head 78 similar to the head 71. The head is mounted on a stem or arm 80, the said arm carrying at its outer end a finger 81.

In the third pocket 69, that is, the pocket disposed nearest the crossing, there is journaled on an upstanding bracket a roller that has on one of its ends a ratchet wheel 82 and the said ratchet wheel is engaged by a pawl 83 that is pivoted to the bracket.

Designed to normally overlie the pocket 69 there is a plate 84. This plate is formed with an angle arm 85 through which passes a pivot 86 that is received in bearings in the pocket 69. The arms or stems 72, 75, 80 and 85 are connected by a link 87.

Arranged transversely and journaled in the pocket 69 there is a roller 88 disposed centrally between the roller on the ratchet wheel 82 and the pivot 86 for the plate 84.

The numeral 90 designates an angle or substantially T-shaped trip member. The depending element of the trip member has connected thereto oppositely directed rods 91 and 92, respectively. The rod 91 is connected with a pivotally supported link that has a bifurcated end 93. This bifurcated end of the link receives therein the offset end of a pivotally connected armature 94. The end of the rod 92 is also loosely connected to a pivotally supported armature 95 and arranged between the armatures 94 and 95 there is an electromagnet 96 which is wired, as at 97, to the rails of the railway, one of the wires 97 being in circuit with the battery.

In this instance the heads 71, 78 and 84, with the roller 89 that is journaled on the inner face thereof are of sufficient weight to normally hold the parts in the position disclosed by Figure 7. A vehicle making the crossing must, of course, travel over the inclined plane 70 which will warn the driver thereof of danger ahead. The vehicle travels over the head 71, causing the same to swing upon its pivot or shaft 72 and likewise imparting a swinging movement to the arm 75 and to the link 87. The driving wheel of the vehicle now passes into the depression or concavity 64. Before this occurs, however, the longitudinal movement of the link 87 brings the finger 81 over the pivotally supported trip member 90 and into engagement therewith. The wheel of the vehicle now travels over the head 78 and as the said head 78 is arranged at an inclination with respect to that of the head 71, the said head 78 will be turned upon the shaft or pivot 77, thereby swinging the arm 80, the link 87 and the elements associated therewith so that the normally horizontal plate 84 and the arm 85 will be swung to horizontal position. If the electromagnet 96 is energized the catch or trip member 90 will be held stationary so that the heads 71 and 78 and the plate 84 will be swung to wheel obstructing positions. When the electro-magnet 9 is energized and the parts latched by the trip 90 as just described and the wheel leaves depression 64 and travels to pocket 69, the driving wheel of the vehicle will turn on the roller provided with the ratchet wheel 82 and likewise on the outer roller 88, so that it will be a matter of impossibility for the vehicle to travel over the crossing when the electro-magnet is energized as when a train is passing the crossing.

Figures 10 to 12 illustrate another modification of my device, the purpose of which is also to prevent accidents at railroad and other crossings, as hereinbefore set out and described, by preventing a horse-drawn vehicle, or automobile, from making a crossing by giving ample warning of danger and making it impossible for vehicles to violate the law by not stopping, and to force autos to come to stop if danger exists whether they attempt passage over the device under power or by coasting over the device and onto the railroad or other roadway, and is described as follows:

Numerals 91, 92 and 93 indicate pockets across the roadway; 94 is a member similar to 71—72, 73, 74, 75 and 76 of Figure 7; 95 is a swingable member similar to 84 of Figure 7; 96 is a lever extending across the runway, pivoted or journaled at 97 in pocket 93; it has an arm 98 extending downward with a curved head 99; has a weight 100 which causes it to maintain its upright position after being depressed either toward or from the crossing; 101—101 are links connecting arms 102 and 103; 104 is an armature with curved headhook 108 at its upper section, its lower section 104 being square-headed, said armature pivoted as at 105 on 101; 106 is an electromagnet; 107—107 are wires forming circuit between rails, battery and magnet; 109 is a depression in roadway; 110, a guide and support for 101; 111, a brass section in shank of armature to prevent magnetizing other parts of the device; 112 is a stopping-element to prevent armature from moving beyond desired point when attracted by magnet; 113 is an abutment member securely attached to casing; 114 are ridges or ribs across runway preceding device.

The operation is as follows: When the front wheels of a vehicle pass over the device traveling toward the railroad tracks or other road crossing, they will depress lever member 96 to dotted line position, which will assume its upright position after the wheels clear it because of the weight 100; this action will be repeated when the rear wheels cross over it, and likewise when traversed by a gondola-car or "trailer." If there be no train in the block, the magnet will not be energized, therefore, there will be no resisting element offered the wheels; but if a train is within the block, the electromagnet 106 will be energized, causing its armature to be attracted downward causing its hooked end 108 to protrude upward and engage the end of arm head 99 of 98 so that pressure exerted against 96 will depress it toward the crossing thereby imparting a swinging motion to links 101—101 which in turn will cause swingable member 95 to assume the upright or dotted line position presenting an obstruction to rear wheels of the vehicle. The action just described results when a horse-drawn vehicle, or a motor car, passes over the device without exerting traction force in its rear wheels; if an automobile crosses it under its own power (not coasting), it will meet with practically no resistance, unless a train is within the block, in which case, the electro-magnet will function as above described, with results as stated above. If there be no train in the block, armature will not be moved from its full line position as in Figure 10; in that position, the passage of wheels over lever 96 will cause no action, as there will be no engagement of the engageable parts; with armature in its said full line position, its head 104 engages or abuts against 113 which prevents movement of all the other parts even if car crosses under its own power, 94 being locked against movement when driving wheels of car pass over it.

If an automobile is automatically stopped by coming in contact with member 94, in order to proceed, it will have to be run backward over said member 94, which will impart a reverse action to 94, closing the swingable member 95, when it may proceed.

If a horse-drawn vehicle should be stopped by it, before the driver can proceed he will have to exert pressure on the top edge of 95, causing it to reseat.

It will be noted that in this model the swingable member 95 when in wheel resisting position is somewhat overbalanced, causing it to remain in said position of its own weight.

Should this model be used at a single runway crossing, vehicles traveling over it away from the railroad would depress the lever 96 but there would be no action on the other parts of the device.

The usual casing and signal heretofore described may be employed if desired. The ribs or ribbon-like member or members 114 are arranged at a given distance from the device to act as a physical warning to drivers of the vehicles that they are approaching the device and are in close proximity to a crossing and, therefore, in a danger zone.

The simplicity and advantages of my construction will, it is thought, be understood and appreciated by those skilled in the art to which such invention relates after the foregoing description has been carefully read in connection with the accompanying drawings so that further detailed description will not be required. It is thought, however, necessary to state that I do not wish to be restricted to the precise details of construction herein set forth and, therefore, hold myself entitled to make such changes therefrom as fairly fall within the scope of what I claim.

Having described the invention, I claim:

1. A safety device in which a roadway for vehicles traverses the tracks of a railway and in which the tracks of the railway have an insulated block therein, elements on said roadway to contact with the wheels of a vehicle traveling in the direction of the railway for imparting a jarring movement to such vehicle, an electro-magnet designed to be energized when a train passes over the block in the railway, armatures attracted by the energized electro-magnet, said roadway having transverse pockets between the obstructing means and the tracks of the railway, vehicle wheel contacting elements in said pockets engageable by the armatures and designed to be moved to wheel contacting position when the magnet is energized and the armature attracted thereby, said wheel contacting means including swingable members which are pivotally secured in the pockets, arms depending therefrom, a link connecting all of the arms, a depending finger on one of the arms, a trigger actuated by the armature of the magnet to engage said finger when the electro-magnet is energized, and a plate having a roller on the inner face thereof and which plate is normally arranged over and covers a pocket.

2. A safety device in which a roadway for vehicles traverses the tracks of a railway and in which the tracks of the railway have an insulated block therein, transverse elements on the roadway to contact with the wheels of a vehicle traveling in the direction of the railway for imparting a jarring movement to such vehicle, an electro-magnet designed to be energized when a train passes over the block, armatures attracted by the energized magnet, said roadway having transverse pockets between the obstructing elements and the tracks of the railway, vehicle wheel obstructing elements in said pockets influenced by the armatures and designed to be moved to obstructing position when the magnet is energized and the armatures attracted thereby, said repelling means including swingable members which are pivotally secured in the pockets, arms depending therefrom, a link connecting all of the arms, a depending finger on one of the arms, a trigger actuated by the armature of the magnet to engage said finger when the electro-magnet is energized, a plate on one of the arms, a roller journaled on said plate, said plate being normally arranged over and covers a pocket, an idler roller in one pocket, a second roller journaled in said pocket and having a ratchet wheel on one end thereof and a pawl engaging the ratchet wheel for holding said roller from movement except in one direction.

3. A safety device in which a highway for vehicles traverses the tracks of a railway and in which the tracks of the railway have an insulated block therein, and further in which said highway has transverse pockets, of pivotally supported wheel obstructing elements in said pockets, one of which comprises a weight influenced normally upright arm having a depending curved head, links with which the other obstructing elements are loosely connected, a catch member pivoted on one of the links swingable to engage the heads and to hold the arm in locked vertical position and likewise to impart a longitudinal movement to the links to swing the remaining obstructing elements to upright positions, an electro-magnet for attracting the catch, in combination with an electric circuit wired to the rails in the block of the railway and to the magnet.

4. A safety device in which a highway traverses a railway and in which the tracks of the railway have insulated blocks therein, said highway having an inclined plane, transverse ribs outwardly thereof, transverse pockets inward of the highway and adjacent to the railway, a pivotally supported obstructing element in each of the pockets, the obstructing element next to the railway comprising a weight influenced arm which is normally held in upright position, and which has a depending portion terminating in a head, a pair of pivotally connected links, guide means therefor, a forked arm on one of the links engaging with one of the obstructing elements and the adjacent obstructing element being pivotally connected with the second link, a catch member pivoted on one of the links, an abutment member for limiting the downward swinging of the catch member, a stop element for limiting the upward movement of the catch member, said catch member being swingable to engage with the head of the arm to hold said arm in locked vertical position, and to impart a longitudinal movement to the links to swing the remaining obstructing elements to upright positions, an armature associated with the catch, an electro-magnet below the armature for attracting the same to swing the catch member, and said electro-magnet being in an electric circuit which is wired to the tracks in the blocks of the railway.

In testimony whereof I affix my signature.

DANIEL M. BENTON.